US012810615B2

(12) United States Patent
Zhao et al.

(10) Patent No.: US 12,810,615 B2
(45) Date of Patent: Nov. 24, 2026

(54) MACHINE LEARNING-BASED PERSONALIZED AUDIO-VIDEO PROGRAM SUMMARIZATION AND ENHANCEMENT

(71) Applicant: Samsung Electronics Co., Ltd., Suwon-si (KR)

(72) Inventors: Xiangyuan Zhao, Irvine, CA (US); Yingnan Zhu, Irvine, CA (US); Hong-Hoe Kim, Aliso Viejo, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 18/528,606

(22) Filed: Dec. 4, 2023

(65) Prior Publication Data

US 2025/0182483 A1 Jun. 5, 2025

(51) Int. Cl.

| | |
|---|---|
| ***G06V 20/40*** | (2022.01) |
| ***G06T 7/246*** | (2017.01) |
| ***G06V 10/762*** | (2022.01) |
| ***G06V 10/82*** | (2022.01) |
| ***G06V 20/70*** | (2022.01) |
| ***H04N 21/81*** | (2011.01) |
| ***H04N 21/8549*** | (2011.01) |

(52) U.S. Cl.

CPC .............. *G06V 20/47* (2022.01); *G06T 7/248* (2017.01); *G06V 10/762* (2022.01); *G06V 10/82* (2022.01); *G06V 20/49* (2022.01); *G06V 20/70* (2022.01); *H04N 21/812* (2013.01); *H04N 21/816* (2013.01); *H04N 21/8549* (2013.01); *G06T 2207/10016* (2013.01)

(58) Field of Classification Search

CPC ...... G06V 20/47; G06V 20/70; G06V 10/762; G06V 20/49; G06V 10/82; G06T 7/248; G06T 2207/10016; H04N 21/812; H04N 21/816; H04N 21/8549

See application file for complete search history.

(56) References Cited

U.S. PATENT DOCUMENTS

| | | | |
|---|---|---|---|
| 10,455,297 B1 * | 10/2019 | Mahyar | .............. H04N 21/4532 |
| 10,812,825 B2 | 10/2020 | Liu et al. | |
| 11,641,446 B2 | 5/2023 | Li | |
| 2004/0008789 A1 | 1/2004 | Divakaran et al. | |

(Continued)

FOREIGN PATENT DOCUMENTS

CN 114786059 B 6/2023

OTHER PUBLICATIONS

Apostolidis et al., "Summarizing Videos using Concentrated Attention and Considering the Uniqueness and Diversity of the Video Frames," Proceedings of the 2022 International Conference on Multimedia Retrieval, Jun. 2022, 9 pages.

(Continued)

*Primary Examiner* — Sunghyoun Park

(57) ABSTRACT

A method includes identifying video features and audio features of an audio-video program. The method also includes processing the video features and the audio features using a semantic video cut machine learning model that is trained to (i) segment the audio-video program into multiple scenes and (ii) cluster the scenes based on one or more user preferences. The method further includes generating an audio-video summarization of the audio-video program using a subset of the scenes based on the one or more user preferences.

20 Claims, 9 Drawing Sheets

(56) References Cited

U.S. PATENT DOCUMENTS

| | | | |
|---|---|---|---|
| 2016/0247328 | A1 | 8/2016 | Han et al. |
| 2016/0292510 | A1 | 10/2016 | Han et al. |
| 2017/0157512 | A1 | 6/2017 | Long et al. |
| 2018/0293737 | A1* | 10/2018 | Sun ........................ G06N 3/045 |
| 2019/0139441 | A1* | 5/2019 | Akella ............... G05B 19/4183 |
| 2019/0325084 | A1 | 10/2019 | Peng et al. |
| 2021/0081677 | A1* | 3/2021 | Wang ...................... G06T 7/174 |
| 2021/0365707 | A1* | 11/2021 | Mao ....................... H04N 23/80 |
| 2022/0138474 | A1 | 5/2022 | Verma et al. |
| 2022/0159086 | A1* | 5/2022 | Kumar .................... H04L 67/54 |
| 2022/0343100 | A1 | 10/2022 | Wu et al. |
| 2022/0414138 | A1 | 12/2022 | Sun et al. |
| 2023/0005505 | A1 | 1/2023 | Shukla et al. |
| 2023/0019025 | A1 | 1/2023 | Charantimath et al. |
| 2023/0055636 | A1 | 2/2023 | Cheng et al. |
| 2023/0262237 | A1* | 8/2023 | Mitra ................... H04N 19/176 |
| 2023/0345090 | A1 | 10/2023 | Flores Guerra |
| 2023/0353798 | A1 | 11/2023 | Trehan |
| 2023/0403441 | A1* | 12/2023 | Varshney ......... H04N 21/23424 |
| 2024/0005587 | A1* | 1/2024 | Kulkarni ................. G06T 13/80 |
| 2025/0022273 | A1* | 1/2025 | Vishwakarma ........ G06V 20/47 |

OTHER PUBLICATIONS

Apostolidis et al., "AC-SUM-GAN: Connecting Actor-Critic and Generative Adversarial Networks for Unsupervised Video Summarization," IEEE Transactions on Circuits and Systems for Video Technology, vol. 31, No. 8, Aug. 2021, 15 pages.

Vaswani et al., "Attention is All You Need," NIPS'17: Proceedings of the 31st International Conference on Neural Information Processing Systems, Dec. 2017, 15 pages.

Gao et al., "Video Frame Interpolation with Flow Transformer," MM '23: Proceedings of the 31st ACM International Conference on Multimedia, Oct. 2023, 11 pages.

International Search Report and Written Opinion of the International Searching Authority dated Aug. 26, 2024 in connection with International Patent Application No. PCT/KR2024/004266, 10 pages.

Supplementary European Search Report dated Sep. 8, 2026 in connection with European Patent Application No. 24898953.5, 8 pages.

* cited by examiner

MACHINE LEARNING-BASED PERSONALIZED AUDIO-VIDEO PROGRAM SUMMARIZATION AND ENHANCEMENT

TECHNICAL FIELD

This disclosure relates generally to machine learning systems and processes. More specifically, this disclosure relates to machine learning-based personalized audio-video program summarization and enhancement.

BACKGROUND

Numerous people watch audio-video programs on televisions, smartphones, computers, and other devices. For example, numerous television shows and other audio-video programs are available on a number of different platforms and can be viewed linearly and on-demand. However, many people may not have the time to sit down and watch a full-length audio-video program. Also, websites and other platforms have begun offering "short video" services that allow users to scroll through and watch relatively short audio-video programs, and these services have become extremely popular in the United States and around the world.

SUMMARY

This disclosure relates to machine learning-based personalized audio-video program summarization and enhancement.

In a first embodiment, a method includes identifying video features and audio features of an audio-video program. The method also includes processing the video features and the audio features using a semantic video cut machine learning model that is trained to (i) segment the audio-video program into multiple scenes and (ii) cluster the scenes based on one or more user preferences. The method further includes generating an audio-video summarization of the audio-video program using a subset of the scenes based on the one or more user preferences.

In a second embodiment, an electronic device includes at least one processing device configured to identify video features and audio features of an audio-video program. The at least one processing device is also configured to process the video features and the audio features using a semantic video cut machine learning model that is trained to (i) segment the audio-video program into multiple scenes and (ii) cluster the scenes based on one or more user preferences. The at least one processing device is further configured to generate an audio-video summarization of the audio-video program using a subset of the scenes based on the one or more user preferences.

In a third embodiment, a non-transitory machine readable medium contains instructions that when executed cause at least one processor of an electronic device to identify video features and audio features of an audio-video program. The non-transitory machine readable medium also contains instructions that when executed cause the at least one processor to process the video features and the audio features using a semantic video cut machine learning model that is trained to (i) segment the audio-video program into multiple scenes and (ii) cluster the scenes based on one or more user preferences. The non-transitory machine readable medium further contains instructions that when executed cause the at least one processor to generate an audio-video summarization of the audio-video program using a subset of the scenes based on the one or more user preferences.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to"

another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
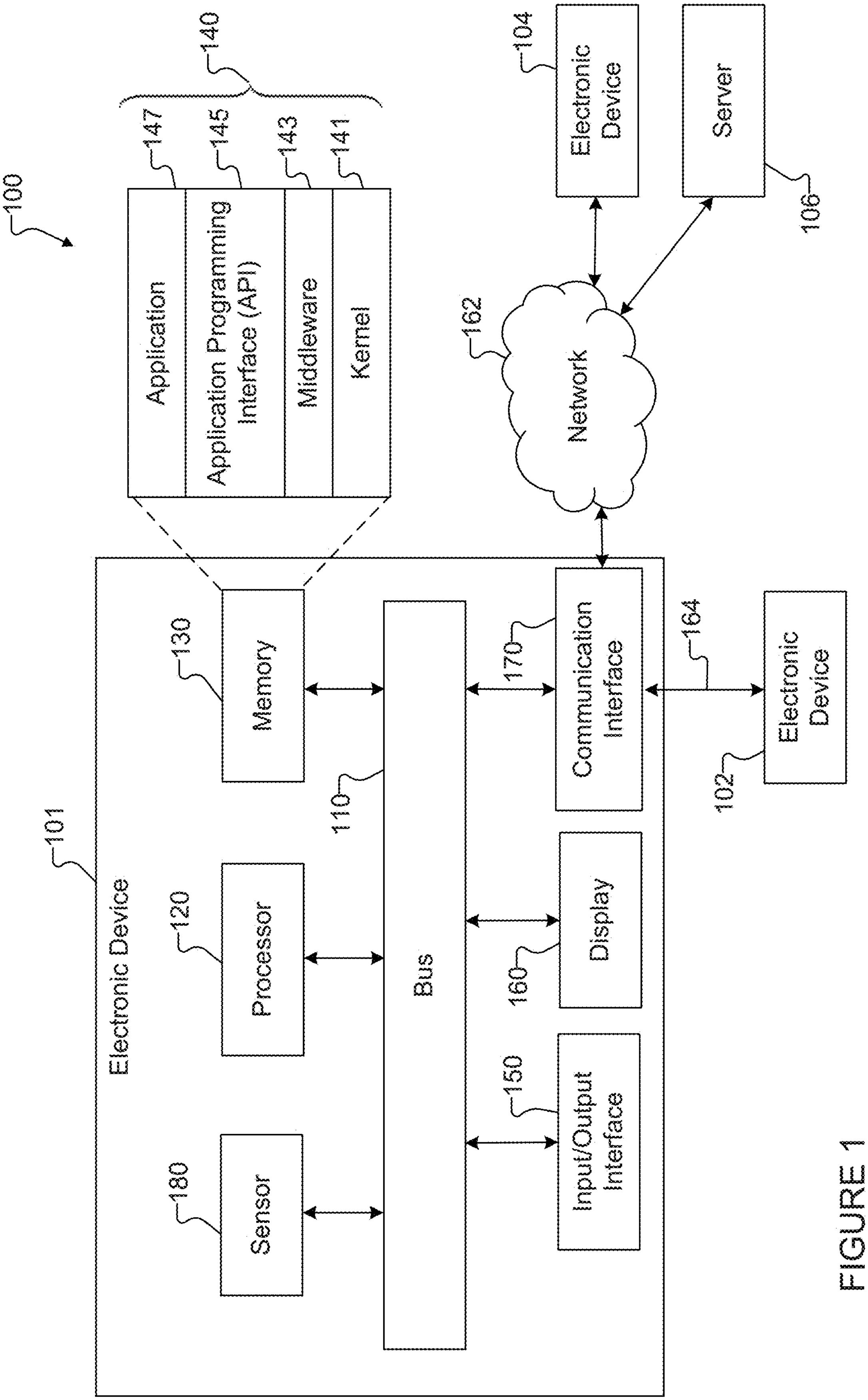
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, numerous people watch audio-video programs on televisions, smartphones, computers, and other devices. For example, numerous television shows and other audio-video programs are available on a number of different platforms and can be viewed linearly and on-demand. However, many people may not have the time to sit down and watch a full-length audio-video program. Also, websites and other platforms have begun offering “short video” services that allow users to scroll through and watch relatively short audio-video programs, and these services have become extremely popular in the United States and around the world.

This disclosure provides various techniques for machine learning-based personalized audio-video program summarization and enhancement. As described in more detail below, video features and audio features of an audio-video program can be identified, and the video features and the audio features can be processed using a semantic video cut machine learning model. The semantic video cut machine learning model is trained to (i) segment the audio-video program into multiple scenes and (ii) cluster the scenes based on one or more user preferences. An audio-video summarization of the audio-video program can be generated using a subset of the scenes based on the one or more user preferences. The audio-video summarization can represent a shorter or summarized version of the audio-video program and can include content that represents or is based on various scenes of the audio-video program, where those scenes are identified as being relevant to a user based on the user preference(s).

The segmentation by the semantic video cut machine learning model can help to segment the audio-video program into scenes while helping to maintain semantic and dialogue completeness within the scenes, which can reduce or avoid the use of unnatural or incomplete scenes within the audio-video summarization. Also, the scenes can be clustered based on the user preference(s) in order to help identify which scenes may or may not be preferred by a user, and the audio-video summarization can be generated using scenes that are preferred by the user. Moreover, part or all of the audio-video summarization may be machine-generated (such as when produced using a generative machine learning model), which can help to reduce or avoid problems associated with trademark usage or other intellectual property concerns. Further, one or more locations for one or more ads may be identified in the audio-video summarization, and at least one ad can be selected for use and inserted into the audio-video summarization based on at least one user preference so that more interesting ads can be inserted in a more pleasing manner to the user. In addition, the audio-video summarization may be processed to add one or more immersive experience video effects (such as by using a frame interpolation network) and/or audio enhancement effects (such as by using a background music generation system) in order to create an enhanced audio-video summarization, which can provide even greater enjoyment for the user.

There are various ways in which the described techniques may be used and various ways in which the resulting audio-video summarizations may be presented. For example, in some embodiments, the described techniques may be used to generate audio-video summarizations of television shows or other audio-video programs that can be selected by a user in a television program guide or other user interface. Rather than simply showing the user a listing of programs (possibly along with a brief textual description and possibly an image) that are available in the television program guide or other user interface, audio-video summarizations of available programs may be generated and presented to the user. As another example, an audio-video content provider may use the described techniques to generate short audio-video summarizations that may be browsed and viewed by users who are not interested in watching longer audio-video programs. As yet another example, an audio-video content provider may use the described techniques to identify locations in audio-video programs where users might be more receptive to the insertion of advertisements. However, it will be understood that the principles of this disclosure may be implemented and used in any other suitable manner.

Note that the various embodiments discussed below can be used in any suitable devices and in any suitable systems. Example devices in which the various embodiments discussed below may be used include various consumer electronic devices, such as smartphones, tablet or other computers, and televisions. However, it will be understood that the principles of this disclosure may be implemented in any number of other suitable contexts.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O)) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform various functions related to machine learning-based personalized audio-video program summarization and enhancement.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for machine learning-based personalized audio-video program summarization and enhancement. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform various functions related to machine learning-based personalized audio-video program summarization and enhancement.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
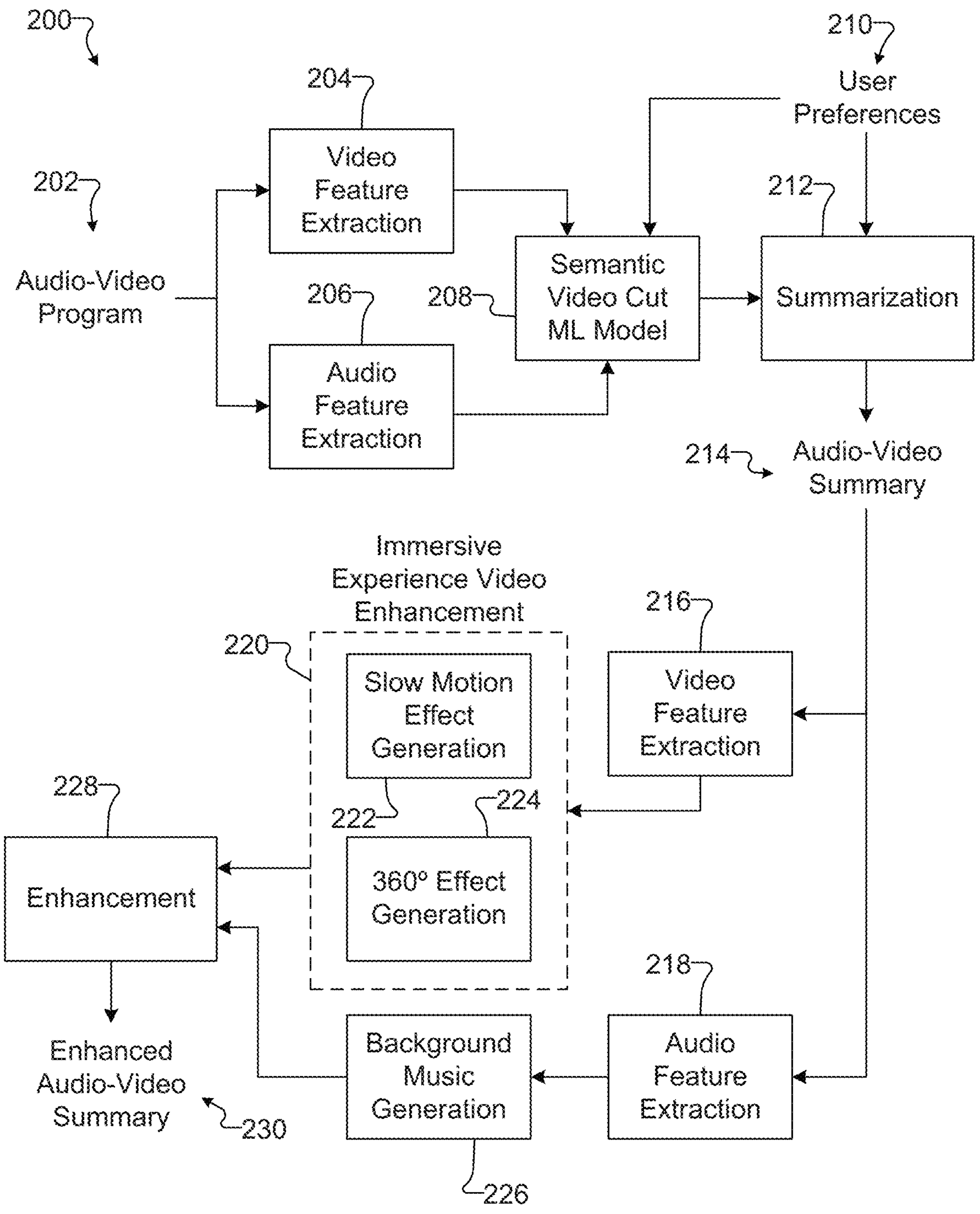
FIG. 2 illustrates an example architecture supporting machine learning-based personalized audio-video program summarization and enhancement in accordance with this disclosure.

FIG. 2 illustrates an example architecture 200 supporting machine learning-based personalized audio-video program summarization and enhancement in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally receives and processes audio-video programs 202. Each audio-video program 202 generally represents a combination of video content and associated audio content. The video content includes image data that can be displayed or processed for display, such as a sequence of images. The audio content includes audio data that can be played or processed for playing, such as a soundtrack. Each audio-video program 202 may be obtained from any suitable source. In general, this disclosure is not limited to any specific source(s) of audio-video programs 202.

The architecture 200 in FIG. 2 includes a summarization pipeline and an enhancement pipeline. Components of the summarization pipeline are generally shown along the top path in FIG. 2, and components of the enhancement pipeline are generally shown along the bottom path in FIG. 2. It should be noted here that the summarization pipeline may be used with or without the enhancement pipeline. That is, the summarization pipeline can be used to generate audio-video program summarizations, and the audio-video program summarizations may or may not be enhanced using the enhancement pipeline.

The summarization pipeline in this example includes a video feature extraction operation 204 and an audio feature extraction operation 206, each of which generally operates to process an audio-video program 202 and identify features of the audio-video program 202. For example, the video content of an audio-video program 202 can be provided to the video feature extraction operation 204, with or without the associated audio content. Also, the audio content of an audio-video program 202 can be provided to the audio feature extraction operation 206, with or without the associated video content. Each feature extraction operation 204 and 206 operates to identify features of the audio-video program 202 that are relevant to the task of audio-video program summarization. For example, each feature extraction operation 204 and 206 may be trained to identify which features are relevant to audio-video program summarization, and each feature extraction operation 204 and 206 can process an audio-video program 202 in order to identify those features of the audio-video program 202. The video feature extraction operation 204 operates to identify features of video content relevant to audio-video program summarization, and the audio feature extraction operation 206 operates to identify features of audio content relevant to audio-video program summarization. Each feature extraction operation 204 and 206 may use any suitable technique(s) to perform feature identification and extraction.

The identified video and audio features are provided to a semantic video cut machine learning (ML) model 208, which generally operates to process the features and segment each audio-video program 202 into multiple scenes. The machine learning model 208 also operates to cluster the identified scenes based on one or more user preferences 210. With respect to segmenting each audio-video program 202 into multiple scenes, each scene may represent a discrete portion of the audio-video program 202. In some cases, the video and audio contents of each scene can relate to a common semantic topic, and the scene may contain dialogue that is generally complete. Completeness of the dialogue can be based on whether the dialogue within the scene appears to start and end within that scene. The machine learning model 208 can be trained to segment each audio-video program 202 into multiple scenes in any suitable manner, such as when the machine learning model 208 is trained using training audio-video programs that are associated with known scene segmentations. Here, the machine learning model 208 can process the training audio-video programs and generate predicted scene segmentations, and the machine learning model 208 can be adjusted based on incorrect scene segmentations generated by the machine learning model 208.

With respect to clustering the identified scenes, the machine learning model 208 can group the identified scenes into different groups or clusters based on their similarities, and the clustering may be based on the one or more user preferences 210. For example, the one or more user preferences 210 may include an identification of one or more genres that a user is interested in viewing, and the machine learning model 208 can cluster the identified scenes into different genres. In some cases, the machine learning model 208 can generate each scene's user preference score based on the cluster in which that scene is grouped and whether the user has indicated a preference for that genre. Thus, for instance, scenes in a cluster associated with a genre in which the user has expressed a preference for can be scored higher, and scenes in a cluster associated with a genre in which the user has not expressed a preference for can be scored lower. Note, however, that the user preference(s) 210 may relate to any other suitable characteristic(s) of the audio-video program 202 and that the user preference(s) 210 may be used in any other suitable manner. The machine learning model 208 can be trained to cluster scenes based on user preferences in any suitable manner, such as when the training audio-video programs processed by the machine learning model 208 during training are associated with known genres or other classifications and the machine learning model 208 is adjusted based on incorrect groupings of identified scenes with the known genres or other classifications.

The machine learning model 208 represents any suitable machine learning algorithm configured to process and segment audio-video programs 202 into scenes and to cluster the identified scenes. In some embodiments, for example, the machine learning model 208 may include a transformer-based machine learning model. One example of a transformer-based cut position proposal network that may be used to implement the machine learning model 208 is described below. Note, however, that the machine learning model 208 may be implemented in any other suitable manner.

A summarization operation 212 generally operates to process each audio-video program 202 based on the scenes identified by the machine learning model 208 in order to generate an audio-video summary 214 for that audio-video program 202. The audio-video summary 214 represents a shortened version of the audio-video program 202 that contains a subset (meaning one or some but not all) of the identified scenes from the audio-video program 202. The identified scenes from an audio-video program 202 that are selected for use in the audio-video summary 202 can be based on the one or more user preferences 210. For example, the summarization operation 212 may determine which scenes from an audio-video program 202 are included in the audio-video summary 214 based on each scene's user preference score. As a particular example, when the one or more user preferences 210 identify one or more preferred genres, the summarization operation 212 can use the scenes clustered into the one or more preferred genres to generate the audio-video summary 214, such as by concatenating the scenes clustered into the one or more preferred genres to generate the audio-video summary 214. Thus, the summarization operation 212 can combine the selected scenes into a shortened audio-video summary 214, which (ideally) contains the type(s) of content that are preferred by the user.

Note that the user preferences 210 here can vary among different users, so the audio-video summaries 214 generated for the different users may contain different subsets of scenes from the same audio-video program 202. As a particular example of this, assume that an audio-video program 202 relates to a cooking show in which contestants prepare food that is judged or criticized by one or more judges or other professionals. One user may indicate that "drama" is a preferred genre, so the audio-video summary 214 generated for that user may contain dramatic scenes from the audio-video program 202. Another user may indicate that "food" is a preferred genre, so the audio-video summary 214 generated for that user may contain scenes showing food from the audio-video program 202. Thus, different audio-video summaries 214 of the same audio-video program 202 can be generated for different users based on those users' preferences 210, which again (ideally) allows the different audio-video summaries 214 to contain the types of content that are preferred by the different users.

The summarization operation 212 may use any suitable technique(s) to select and combine scenes from audio-video programs 202 in order to generate audio-video summaries 214. For example, in some embodiments, the summarization operation 212 may use a knapsack algorithm to balance scene scores and scene lengths. The knapsack algorithm here is generally directed at determining which scenes from an audio-video program 202 should be included in an audio-video summary 214 that has a fixed length or other generally time-constrained length. Ideally, the summarization operation 212 here can select the scenes that have the most value or interest to a user. The summarization operation 212 may also or alternatively use a maximum sensitivity algorithm to select scenes that most closely match the one or more user preferences 210.

The enhancement pipeline in this example includes a video feature extraction operation 216 and an audio feature extraction operation 218, each of which generally operates to process an audio-video summary 214 and identify features of the audio-video summary 214. For example, the video content of an audio-video summary 214 can be provided to the video feature extraction operation 216, with or without the associated audio content. Also, the audio content of an audio-video summary 214 can be provided to the audio feature extraction operation 218, with or without the associated video content. Each feature extraction operation 216 and 218 operates to identify features of the audio-video summary 214 that are relevant to the task of audio-video program enhancement. For example, each feature extraction operation 216 and 218 may be trained to identify which features are relevant to audio-video program enhancement, and each feature extraction operation 216 and 218 can process an audio-video summary 214 in order to identify those features of the audio-video summary 214. The video feature extraction operation 216 operates to identify features of video content relevant to audio-video program enhancement, and the audio feature extraction operation 218 operates to identify features of audio content relevant to audio-video program enhancement. Each feature extraction operation 216 and 218 may use any suitable technique(s) to perform feature identification and extraction. Note that while the video feature extraction operations 204 and 216 are shown separately here, the same logic may be used to perform both operations 204 and 216. Similarly, note that while the audio feature extraction operations 206 and 218 are shown separately here, the same logic may be used to perform both operations 206 and 218.

The identified video features (with or without the identified audio features) are provided to an immersive experience video enhancement operation 220, which generally operates to create one or more enhanced visual effects for an audio-video summary 214. There are various types of visual effects that may be created within the video content of an audio-video summary. In this particular embodiment, two example visual enhancements may be provided by a slow motion effect generation operation 222 and a 360° effect generation operation 224. The slow motion effect generation operation 222 can be used to slow down motion captured in a portion of an audio-video summary 214, such as for dramatic effect. As a particular example, the slow motion effect generation operation 222 may slow down motion captured in a particular play or other portion of a sporting event or slow down motion captured in an action-based portion of the audio-video summary 214. The 360° effect generation operation 224 can be used to create video content that appears to be captured from multiple camera angles using image data captured from one camera angle. As a particular example, the 360° effect generation operation 224 may take one-direction images of a skier or other object and generate a 360° view of that object. Various video enhancements can involve the use of a machine learning model or other logic trained or designed to interpolate additional image frames between actual image frames of an audio-video summary 214. One example of machine learning-based video enhancement that may be used to implement the video enhancement operation 220 is described below.

The identified audio features (with or without the identified video features) are provided to a background music generation operation 226, which generally operates to create background music or other enhanced audio data for an audio-video summary 214. For example, the background music generation operation 226 may be used to enhance original background music in an audio-video summary 214 (which can come from the original audio-video program 202 being summarized) or add new background music for the audio-video summary 214. In some cases, the background music that is added may span multiple scenes from the original audio-video program 202 that are included in the audio-video summary 214, which can help to reduce or avoid abrupt changes in the background music in the audio-video summary 214. The background music generation operation 226 may use any suitable technique(s) to enhance or create background music or other enhanced audio data for an audio-video summary 214. In some embodiments, the background music generation operation 226 may include a generative machine learning model that is trained to enhance or generate background music. One example of machine learning-based audio enhancement that may be used to implement the background music generation operation 226 is described below.

Any video enhancements from the immersive experience video enhancement operation 220 and any audio enhancements from the background music generation operation 226 are provided to an enhancement operation 228, which generally operates to combine the video and audio enhancements for an audio-video summary 214 (possibly along with unenhanced portions of the audio-video summary 214) in order to generate an enhanced audio-video summary 230. The enhanced audio-video summary 230 can represent the associated audio-video summary 214 along with any video and audio enhancements. For example, the video content of the enhanced audio-video summary 230 may represent the video content from the original audio-video summary 214, along with at least one slow motion and/or 360° sequence not included in the audio-video summary 214. As another example, the audio content of the enhanced audio-video summary 230 may represent the audio content of the original audio-video summary 214, along with any enhanced or new background music for one or more scenes. The enhancement operation 228 may use any suitable technique(s) to combine video content and audio content in order to generate an enhanced audio-video summary.

Note that the architecture 200 here may be used to summarize and optionally enhance any suitable number of audio-video programs 202, and the architecture 200 here may summarize and optionally enhance audio-video programs 202 for any number of users based on any number of user preferences 210. In some embodiments, for example, the architecture 200 may be implemented on a particular user's device, in which case the architecture 200 may summarize and optionally enhance audio-video programs 202 that are available at that user's device. In other embodiments, the architecture 200 may be implemented on a server or other non-user-specific device, in which case the architecture 200 may summarize and optionally enhance audio-video programs 202 that are available at the server or other non-user-specific device for multiple users. As a specific example of this, the architecture 200 may be implemented on a server associated with an audio-video content provider that provides linear programming or that provides audio-video content on-demand.

Although FIG. 2 illustrates one example of an architecture 200 supporting machine learning-based personalized audio-video program summarization and enhancement, various changes may be made to FIG. 2. For example, various components or functions in FIG. 2 may be combined, further subdivided, replicated, or rearranged according to particular needs. Also, one or more additional components or functions may be included if needed or desired.

Figure 3:
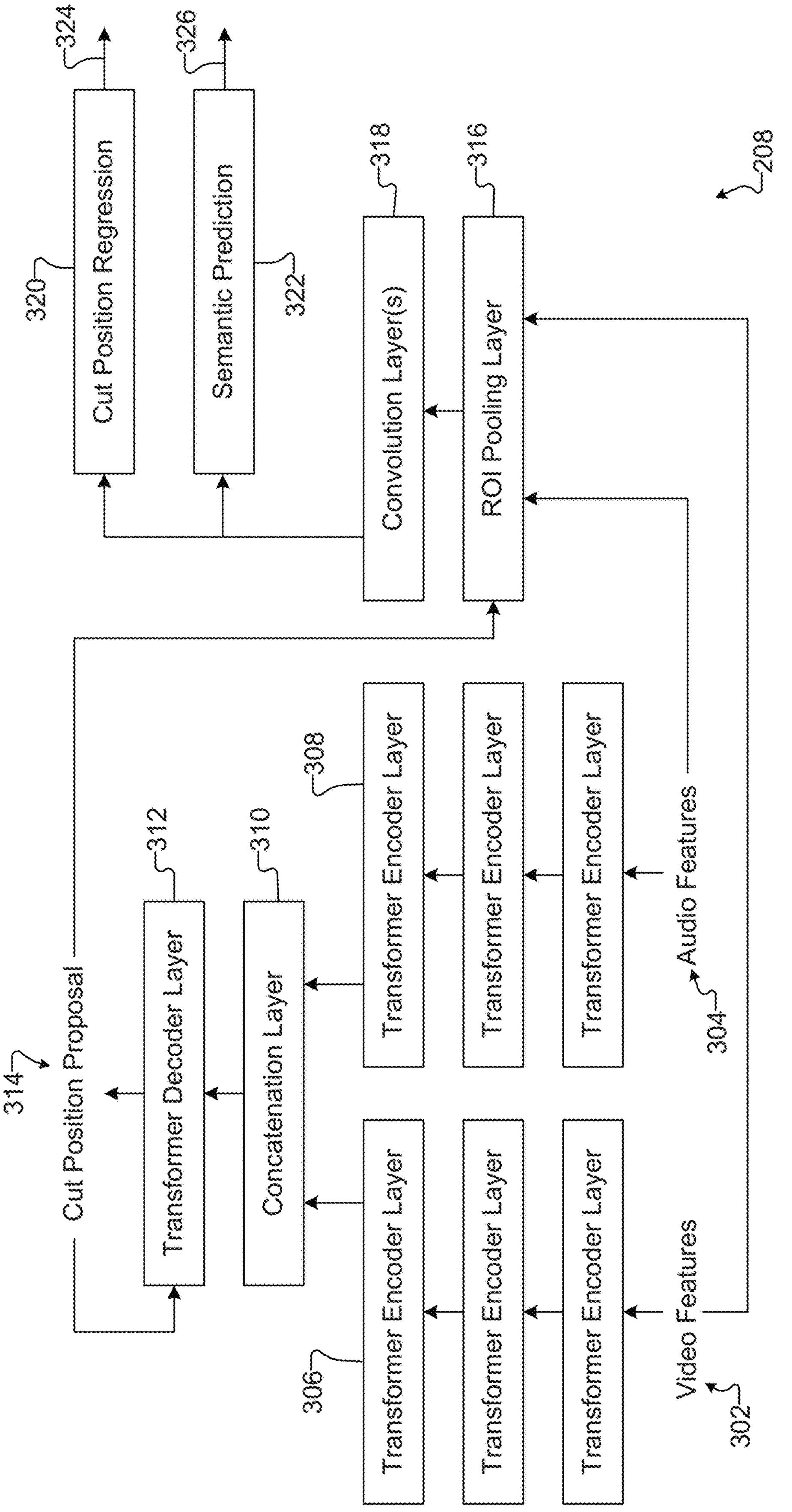
FIG. 3 illustrates an example semantic video cut machine learning model in the architecture of FIG. 2 in accordance with this disclosure.

FIG. 3 illustrates an example semantic video cut machine learning model 208 in the architecture 200 of FIG. 2 in accordance with this disclosure. As shown in FIG. 3, the machine learning model 208 receives and processes video features 302 and audio features 304. The video features 302 are generated using the video feature extraction operation 204, and the audio features 304 are generated using the audio feature extraction operation 206. The video features 302 are processed using a set of transformer encoder layers 306, which are trained to convert the video features 302 into embedding vectors that represent encoded video features. The audio features 304 are similarly processed using a set of transformer encoder layers 308, which are trained to convert the audio features 304 into embedding vectors that represent encoded audio features. In some cases, each set of transformer encoder layers 306, 308 can generate the associated embedding vectors using positional information associated with the features 302, 304 and using self-attention. Note that while three transformer encoder layers 306 and three transformer encoder layers 308 are shown here, the video features 302 may be processed using any suitable number of transformer encoder layers 306, and the audio features 304 may be processed using any suitable number of transformer encoder layers 308.

The resulting embedding vectors from the transformer encoder layers 306, 308 are provided to a concatenation layer 310, which generally operates to combine the embedding vectors and generate combined embedding vectors. This effectively combines the encoded video features and the encoded audio features in order to produce combined encoded features. The concatenation layer 310 can use any suitable technique to combine the embedding vectors from the transformer encoder layers 306, 308, such as by concatenating the encoded audio features at the end of the encoded video features (or vice versa). The combined embedding vectors are provided to at least one transformer decoder layer 312, which generally operates to process the combined embedding vectors and one or more previous outputs of the transformer decoder layer 312 (if any) in order to generate an initial cut position proposal 314. The initial cut position proposal 314 represents an initial estimate of how the audio-video program 202 associated with the features 302, 304 may be divided or segmented into different scenes. For example, the initial cut position proposal 314 may represent a mask that identifies different cut points where the associated audio-video program 202 may be segmented into different scenes.

The transformer encoder layers 306, 308 and the at least one transformer decoder layer 312 may be implemented in any suitable manner. In some embodiments, for example, the transformer encoder layers 306, 308 and the at least one transformer decoder layer 312 may be implemented as described in Vaswani et al., "Attention is All You Need," NIPS'17: Proceedings of the 31st International Conference on Neural Information Processing Systems, December 2017 (which is hereby incorporated by reference in its entirety). However, the various transformer encoder and decoder layers 306, 308, 312 may be implemented in any other suitable manner.

The video features 302, the audio features 304, and the initial cut position proposal 314 are provided to a region of interest (ROI) pooling layer 316, which generally operates to process this information and generate a processed cut position proposal. The processed cut position proposal may represent the initial cut position proposal 314 as modified to identify scenes of the same fixed length. This type of pooling may be needed since one or more convolution layers 318 that receive the processed cut position proposal may expect to receive scenes of fixed length. The ROI pooling layer 316 can use any suitable technique(s) to convert an initial cut position proposal 314 into a processed cut position proposal having scenes of the same length. Note, however, that this may not be required if the convolution layer(s) 318 can process scenes of various lengths. The one or more convolution layers 318 are configured to convolve the processed cut position proposal in order to generate a convolved cut position proposal. For example, each of the one or more convolution layers 318 may apply a suitable filter or kernel to the processed cut position proposal or the output from a preceding convolution layer. The machine learning model 208 may include any suitable number of convolution layers 318, including a single convolution layer 318. Each convolution layer 318 may use any suitable kernel, which can be defined during training of the machine learning model 208.

A multi-task layer follows the convolution layer(s) 318 and includes a cut position regression operation 320 and a semantic prediction operation 322. The cut position regression operation 320 generally operates to process the convolved cut position proposal in order to generate a fine-tuned cut position proposal 324. For example, the cut position regression operation 320 can perform regression to predict how scene cuts in the convolved cut position proposal should be shifted in order to more accurately segment the associated audio-video program 202 into scenes. Among other things, this can be done to help ensure that dialog in each scene is more complete and not cut or split between different scenes. The fine-tuned cut position proposal 324 here can identify the final segmentation of the associated audio-video program 202 into multiple scenes.

The semantic prediction operation 322 generally operates to process the convolved cut position proposal in order to generate predicted semantic labels for the different scenes. The semantic labels identify different types of content associated with the different scenes of the audio-video program 202. The semantic prediction operation 322 here may use the one or more user preferences 210 when generating the semantic labels. For example, if the one or more user preferences 210 identify one or more genres that the user prefers, the semantic labels may represent estimated genres for the individual scenes of the associated audio-video program 202. As a particular example, the semantic labels may indicate whether scenes of the associated audio-video program 202 are associated with genres like drama, comedy, or sports. If the one or more user preferences 210 identify one or more types of objects that the user prefers, the semantic labels may represent estimated objects contained in the individual scenes of the associated audio-video program 202. As a particular example, the semantic labels may indicate whether scenes of the associated audio-video program 202 are associated with food, drinks, cars or other vehicles, natural scenery, or other image contents. In some cases, the semantic labels may represent or be used to generate user preference scores, which can represent numerical values identifying whether the associated scenes may or may not satisfy the user preference(s) 210. Labeling the various scenes of an audio-video program 202 using the semantic labels clusters the scenes of the audio-video program 202 into different clusters, where the clusters can be based on the user preference(s) 210 (like when different clusters represent different genres or different objects in the audio-video program 202).

Figure 4:
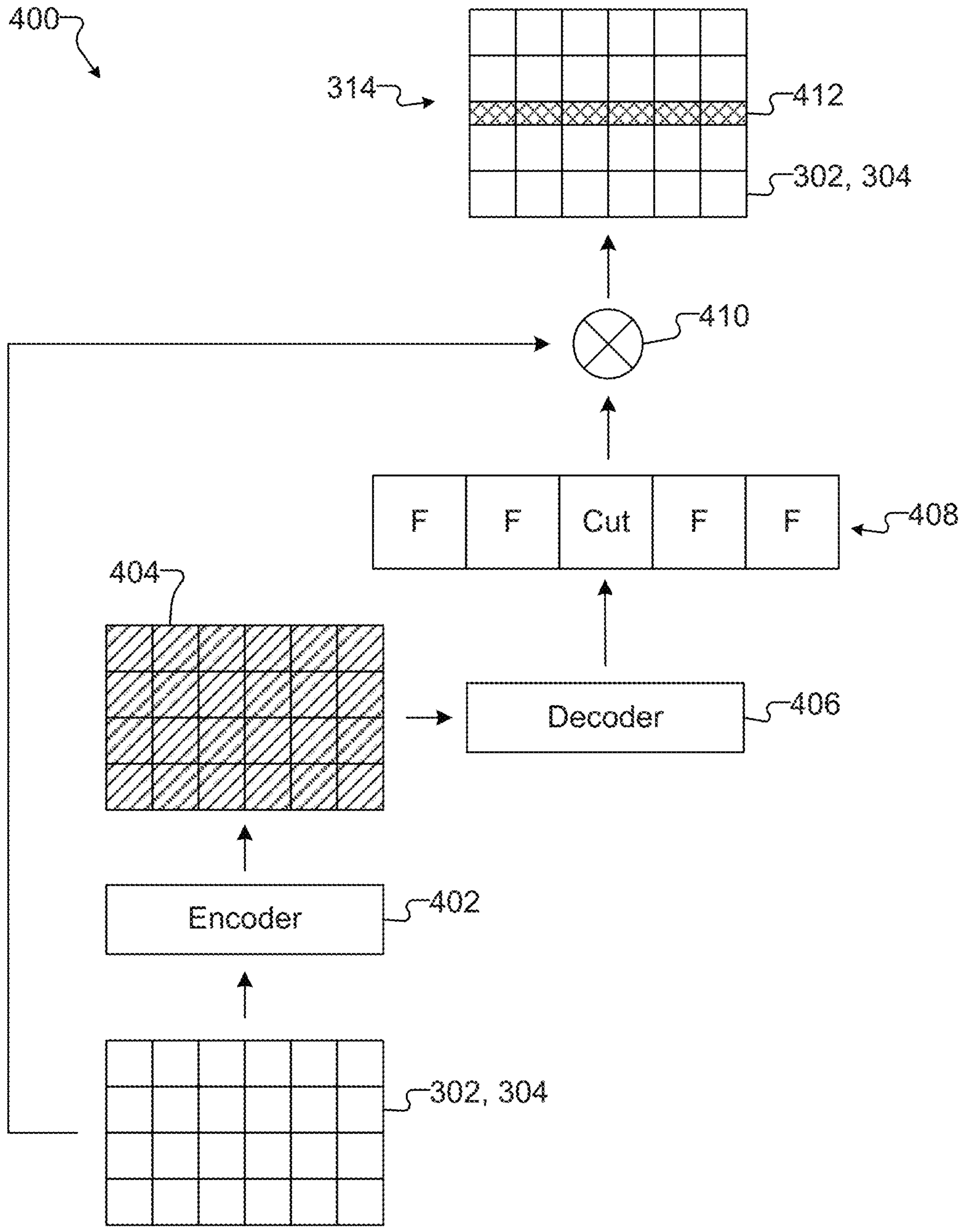
FIG. 4 illustrates an example segmentation of an audio-video program into multiple scenes using the semantic video cut machine learning model of FIG. 3 in accordance with this disclosure.

FIG. 4 illustrates an example segmentation 400 of an audio-video program 202 into multiple scenes using the semantic video cut machine learning model 208 of FIG. 3 in accordance with this disclosure. As shown in FIG. 4, the video features 302 and the audio features 304 are received as input to the machine learning model 208. In some cases, each row of the features 302, 304 may be associated with a different image frame in the audio-video program 202. The features 302, 304 are provided to an encoder 402, which can be implemented using the transformer encoder layers 306, 308 described above. The resulting encoded features 404 are provided to a decoder 406, which can be implemented using the transformer decoder layer(s) 312 described above. The decoder 406 generates a mask 408 that identifies where initial cut positions between scenes might be located. In this example, the mask 408 uses "F" to represent a frame within a scene and "Cut" to represent a potential cut point between different scenes. A multiplier 410 can be used to multiply the original features 302, 304 by the mask 408 in order to generate an initial cut position proposal 314. In this example, the initial cut position proposal 314 can include the features 302, 304 for different scenes that are separated by cut markers 412 indicating where different scenes may start/end.

Although FIGS. 3 and 4 illustrate one example of a semantic video cut machine learning model 208 in the architecture 200 of FIG. 2 and related details, various changes may be made to FIGS. 3 and 4. For example, various components or functions in FIG. 3 may be combined, further subdivided, replicated, or rearranged according to particular needs. Also, one or more additional components or functions may be included if needed or desired. In addition, the example shown in FIG. 4 is for illustration and explanation only, and the semantic video cut machine learning model 208 may process features 302, 304 in any other suitable manner to generate initial cut position proposals 314.

Figure 5:
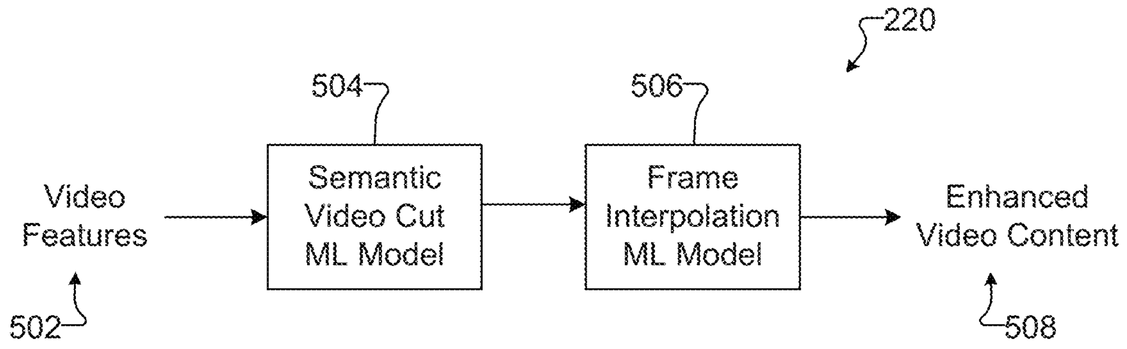
FIG. 5 illustrates an example immersive experience video enhancement operation in the architecture of FIG. 2 in accordance with this disclosure.

FIG. 5 illustrates an example immersive experience video enhancement operation 220 in the architecture 200 of FIG. 2 in accordance with this disclosure. As shown in FIG. 5, the video enhancement operation 220 receives and processes video features 502, which are generated using the video feature extraction operation 216 based on an audio-video summary 214. The video features 502 are processed using a semantic video cut machine learning model 504, which determines at which point or points (if any) within the audio-video summary 214 where one or more video enhancements may be created. In some cases, the machine learning model 504 may be implemented in a similar manner as the machine learning model 208 shown in FIG. 3. However, in this case, the machine learning model 504 may process only video features 502, so the transformer encoder layers 308 and the concatenation layer 310 may not be needed in the machine learning model 504. Also, the cut position regression operation 320 in the machine learning model 504 may operate to identify at least one position where at least one immersive experience video effect can be created, and the semantic prediction operation 322 in the machine learning model 504 may operate to identify information for producing the at least one immersive experience video effect. As particular examples, the semantic prediction operation 322 may identify importance and optical flow analysis information when a video effect is a slow motion video effect, and the semantic prediction operation 322 may identify importance and camera angle analysis information when a video effect is a 360° video effect.

A frame interpolation machine learning model 506 is used to perform frame interpolation in order to generate image frames that can be used to provide the desired video effect(s). For example, when the video effect is a slow motion video effect, the frame interpolation machine learning model 506 can be used to generate additional image frames between each pair of image frames in a video sequence undergoing the slow motion video effect. The presence of the additional image frames can cause movements within the video sequence to occur more slowly during playback, thereby providing the slow motion video effect. When the video effect is a 360° video effect, the frame interpolation machine learning model 506 can be used to generate additional image frames that appear to show the scene captured in a video sequence from different angles around an object or other point within the scene. The presence of the additional image frames can show an object or other point within the scene from those different angles during playback, thereby providing the 360° video effect. This results in the generation of enhanced video content 508, which may be used to form an enhanced audio-video summary 230.

The machine learning model 506 represents any suitable machine learning algorithm configured to generate image frames or other image data in order to create desired video effects in a video sequence. For example, the machine learning model 506 may represent a generative machine learning model that is trained to perform infilling by taking two image frames and generating a specific video effect in between the two image frames. Note, however, that the machine learning model 506 may be implemented in any other suitable manner.

Figure 6:
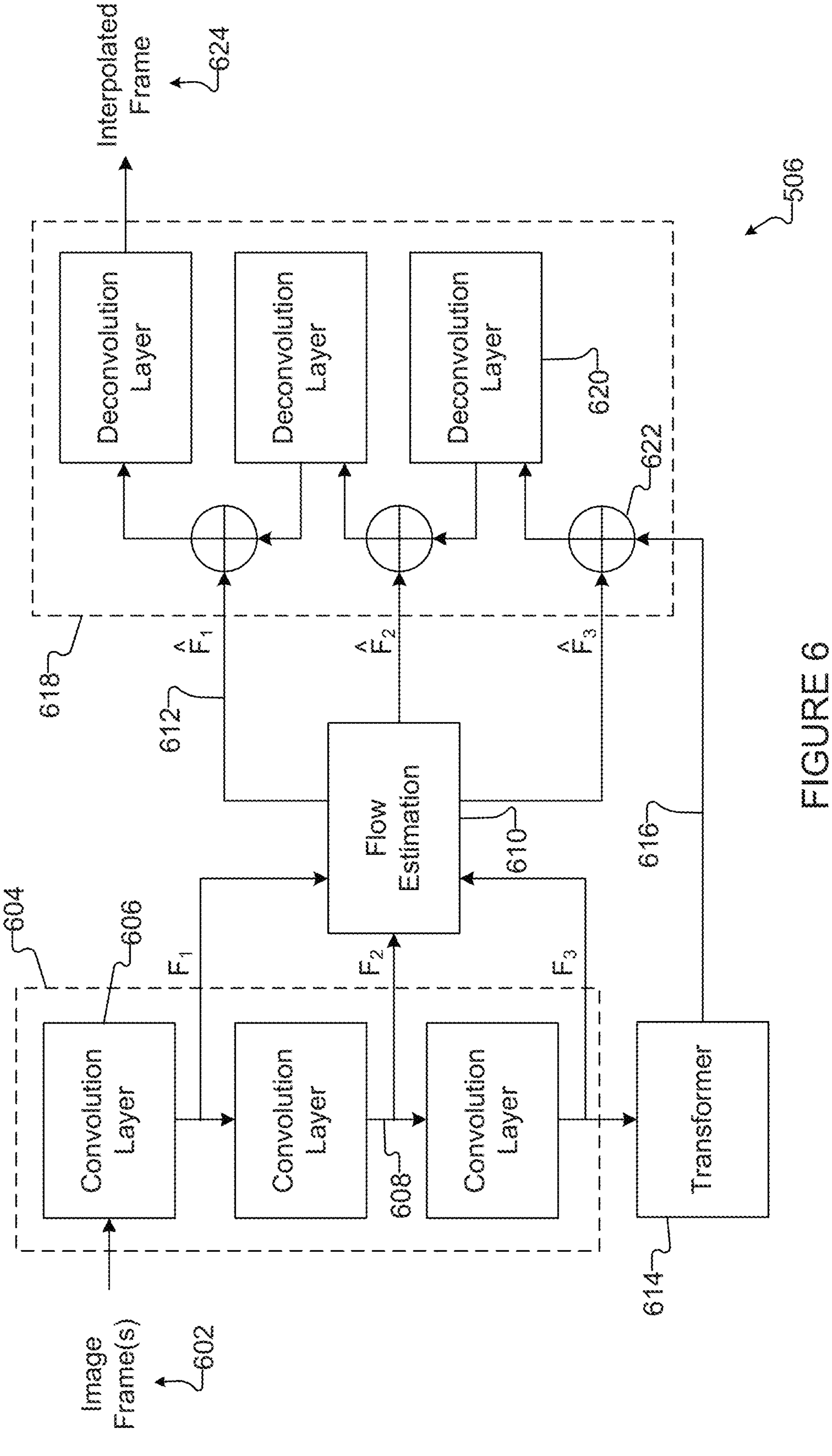
FIG. 6 illustrates an example frame interpolation machine learning model in the immersive experience video enhancement operation of FIG. 5 in accordance with this disclosure.

FIG. 6 illustrates an example frame interpolation machine learning model 506 in the immersive experience video enhancement operation 220 of FIG. 5 in accordance with this disclosure. As shown in FIG. 6, the machine learning model 506 can receive one or more input image frames 602, such as one or more image frames contained in an audio-video summary 214. In some embodiments, the machine learning model 506 may receive two input image frames 602, where one image frame 602 (denoted $I_0$) is positioned immediately before an identified point where a video enhancement is to occur and another image frame 602 (denoted $I_t$) is positioned immediately after the identified point where the video enhancement is to occur.

Each of the input image frames 602 is processed using an encoder 604, which in this example is formed using multiple convolution layers 606. The convolution layers 606 operate to generate features 608 based on the inputs to the convolution layers 606. The topmost convolution layer 606 here receives each input image frame 602, and each subsequent convolution layer 606 here receives the features 608 from the previous convolution layer 606. In this example, there are three convolution layers 606 that generate three sets $F_1$-$F_3$ of features 608, although the numbers of convolution layers 606 and associated sets of features 608 can vary. Note that the encoder 604 here can generate sets of features 608 for each input image frame 602, such as for the $I_0$ image frame and the $I_t$ image frame.

The features 608 are provided to a flow estimation operation 610, which generally operates to process the features 608 and identify flow features 612 based on the features 608. The flow features 612 can identify how common features of multiple image frames 602 move in between the image frames 602. In this example, three sets $\hat{F}_1$-$\hat{F}_3$ of flow features 612 are generated, although the number of sets of flow features 612 can vary. The flow estimation operation 610 can use any suitable technique(s) to identify flow features 612, such as by calculating residuals between features 608 and generating the flow features 612 based on the residuals. One example implementation of the flow estimation operation 610 is described below.

At least some of the features 608 from the encoder 604 are provided to a transformer 614, which processes those features 608 in order to generate predicted features 616. The predicted features 616 are associated with an additional image frame to be generated. For example, when the input image frames $I_0$ and $I_t$ are associated with two different times, the transformer 614 may estimate the features of an additional image frame at time t/2, where this additional image frame may be denoted as $I_{t/2}$. In some cases, the transformer 614 can perform video frame interpolation based on identified flows between the image frames 602.

The flow features 612 and the predicted features 616 are provided to a decoder 618, which in this example is formed using multiple deconvolution layers 620 and multiple combiners 622. The deconvolution layers 620 operate to generate an interpolated image frame 624 based on the flow features 612 and the predicted features 616. The bottommost combiner 622 combines the predicted features 616 and one set $\hat{F}_3$ of flow features 612 and provides the results to the bottommost deconvolution layer 620. Each subsequent combiner 622 combines the outputs of the prior deconvolution layer and another set $\hat{F}_2$ or $\hat{F}_1$ of flow features 612 and provides the results to the next higher deconvolution layer 620. The topmost deconvolution layer 620 generates the interpolated image frame 624, which may represent an image frame that is temporally positioned between the two image frames $I_0$ and $I_t$. In this example, there are three deconvolution layers 620 and three combiners 622, although the numbers of deconvolution layers 620 and combiners 622 can vary.

The approach shown in FIG. 6 can be repeated any number of times in order to generate any desired number of interpolated image frames 624, and the inputs to the frame interpolation machine learning model 506 can vary in order to generate these interpolated image frames 624. For example, during a first iteration, the image frames $I_0$ and $I_t$ can be input to and processed by the machine learning model 506 in order to generate an interpolated image frame $I_{t/2}$. During other iterations, the image frames $I_0$ and $I_{t/2}$ can be input to and processed by the machine learning model 506 in order to generate an interpolated image frame $I_{t/4}$, and the image frames $I_{t/2}$ and $I_t$ can be input to and processed by the machine learning model 506 in order to generate an interpolated image frame $I_{3t/4}$. This can be repeated to generate interpolated image frames such as $I_{t/8}$, $I_{3t/8}$, $I_{5t/8}$, $I_{7t/8}$, $I_{t/16}$, $I_{3t/16}$, $I_{5t/16}$, $I_{7t/16}$, $I_{9t/16}$, $I_{11t/16}$, $I_{13t/16}$, $I_{15t/16}$, etc.

Figure 7:
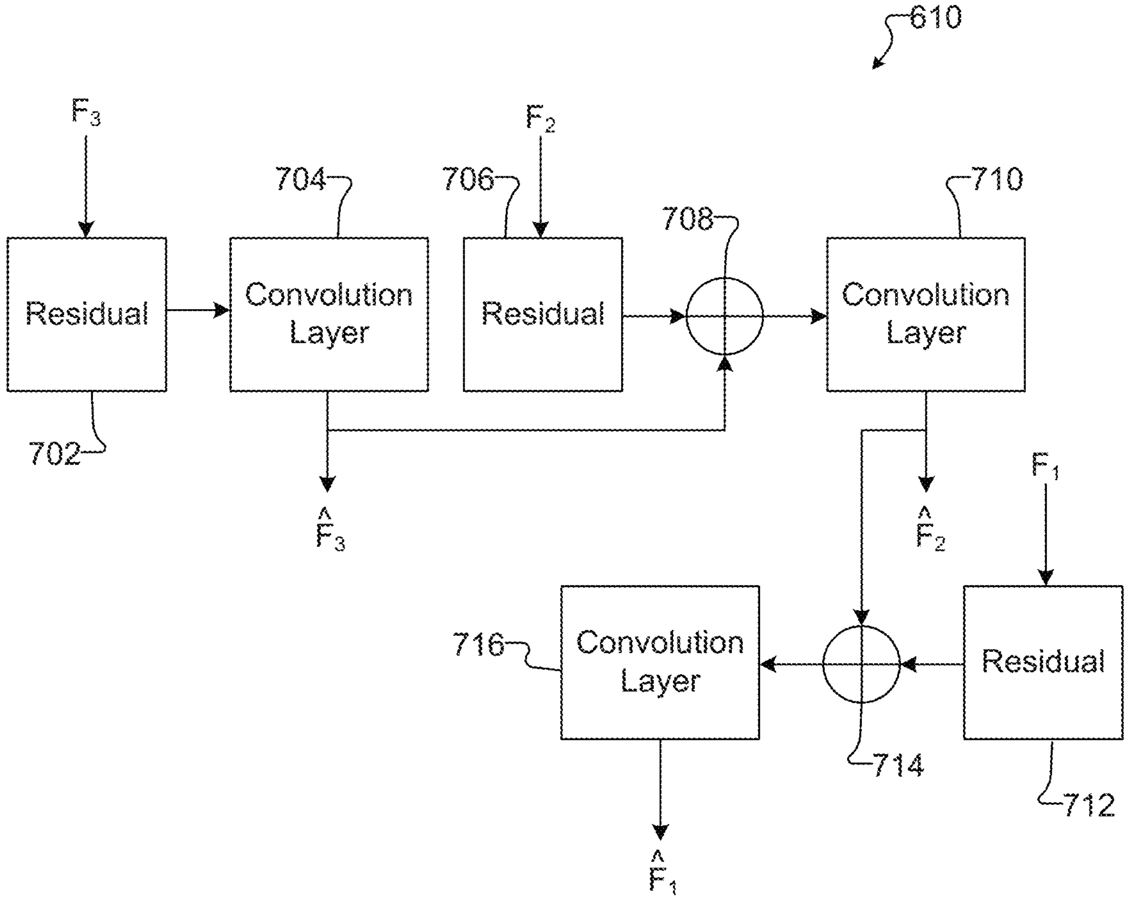
FIG. 7 illustrates an example flow estimation operation in the frame interpolation machine learning model of FIG. 6 in accordance with this disclosure.

FIG. 7 illustrates an example flow estimation operation 610 in the frame interpolation machine learning model 506 of FIG. 6 in accordance with this disclosure. As shown in FIG. 7, the sets $F_3$ of features 608 of the image frames 602 are provided to a residual calculation operation 702, which operates to identify the differences or residuals between the sets $F_3$ of features 608. A convolution layer 704 performs a convolution of the residuals in order to generate the set $\hat{F}_3$ of flow features 612.

The sets $F_2$ of features 608 of the image frames 602 are provided to a residual calculation operation 706, which operates to identify the differences or residuals between the sets $F_2$ of features 608. A combiner 708 combines these residuals with the prior set $\hat{F}_3$ of flow features 612, and the resulting combination is provided to a convolution layer 710 that performs a convolution of these inputs in order to generate the next set $\hat{F}_2$ of flow features 612. The sets $F_1$ of features 608 of the image frames 602 are provided to a residual calculation operation 712, which operates to identify the differences or residuals between the sets $F_1$ of features 608. A combiner 714 combines these residuals with the prior set $\hat{F}_2$ of flow features 612, and the resulting combination is provided to a convolution layer 716 that performs a convolution of these inputs in order to generate the last set $\hat{F}_1$ of flow features 612. If needed or desired, the flow estimation operation 610 here can be expanded to support the processing of additional sets of flow features 612.

Although FIGS. 5 through 7 illustrate one example of an immersive experience video enhancement operation 220 in the architecture 200 of FIG. 2 and related details, various changes may be made to FIGS. 5 through 7. For example, various components or functions in FIGS. 5 through 7 may be combined, further subdivided, replicated, or rearranged according to particular needs. Also, one or more additional components or functions may be included if needed or desired. In addition, while often described as processing features of audio-video summaries 214, the features may also or alternatively represent features of audio-video programs 202 (since the audio-video summaries 214 can be generated using the audio-video programs 202).

Figure 8:
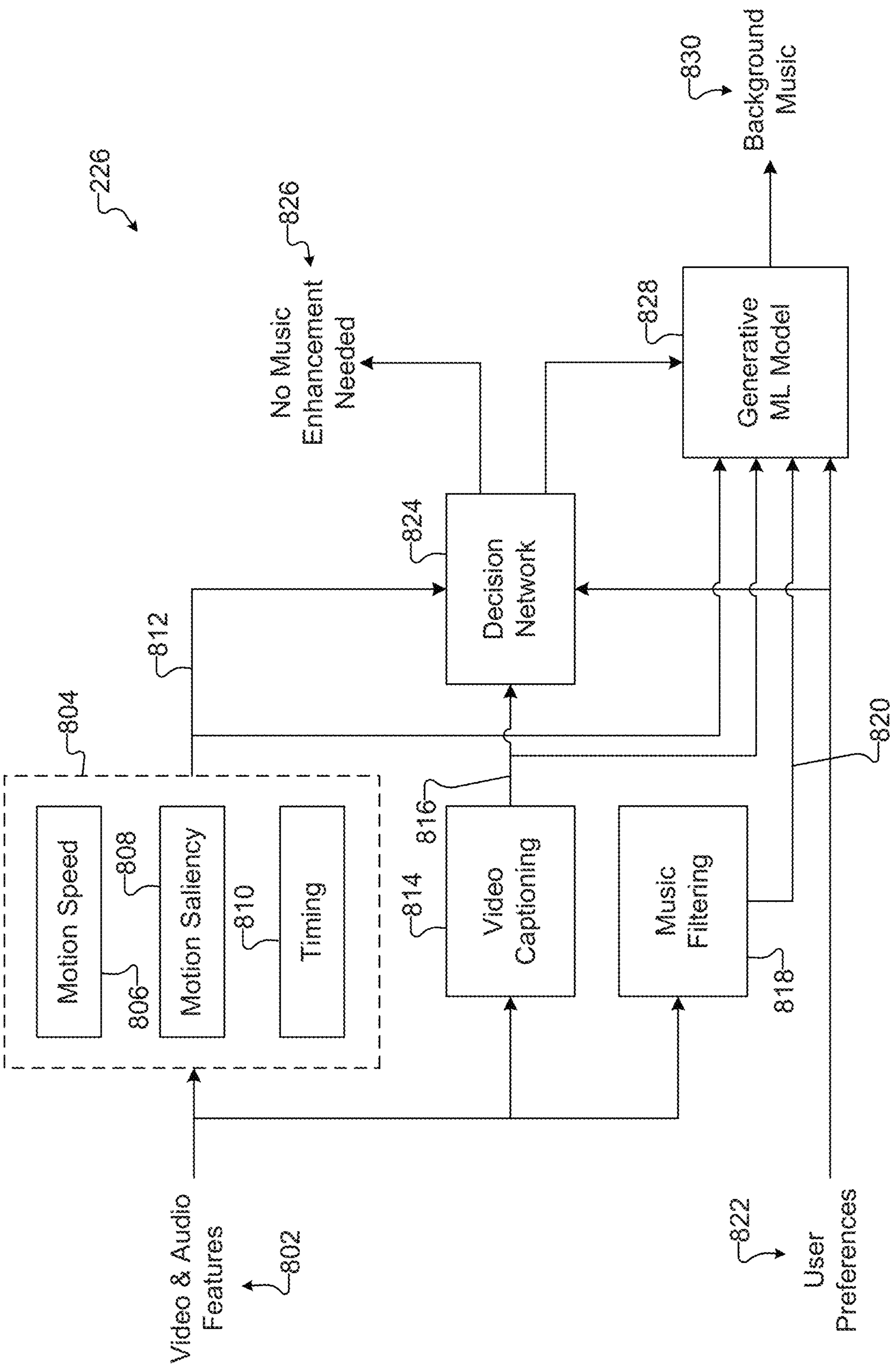
FIG. 8 illustrates an example background music generation operation in the architecture of FIG. 2 in accordance with this disclosure.

FIG. 8 illustrates an example background music generation operation 226 in the architecture 200 of FIG. 2 in accordance with this disclosure. As shown in FIG. 8, the background music generation operation 226 receives and processes video and audio features 802, which are generated using the video feature extraction operation 216 and the audio feature extraction operation 218 based on an audio-video summary 214. The video and audio features 802 may, for instance, include the video features 502 discussed above. The video and audio features 802 are processed using a rhythmic features analysis operation 804, which generally operates to identify rhythmic features associated with the audio-video summary 214. Various rhythmic features may be identified by the analysis operation 804, such as when motion speed, motion saliency, and timing are identified using corresponding functions 806, 808, and 810 of the analysis operation 804. Motion speed can generally relate to the speed at which video or audio contents of the audio-video summary 214 are changing. Motion saliency can generally relate to the conspicuousness or prominence of motion within the audio-video summary 214. Timing can generally relate to specific times or time periods when certain characteristics of other rhythmic features are present in the audio-video summary 214. The rhythmic features analysis operation 804 here generates various outputs 812 representing the identified motion speed, motion saliency, timing, or other identified rhythmic features of the audio-video summary 214.

The video and audio features 802 are also provided to a video captioning operation 814, which generally operates to process the video and audio features 802 in order to generate video captions 816. The video captions 816 represent text-based descriptions or other descriptions describing the actions or other events occurring within the audio-video summary 214. The video captioning operation 814 may use any suitable technique(s) for generating captions associated with audio-video summaries 214. The video and audio features 802 are further provided to a music filtering operation 818, which can process the features 802 and determine whether it appears the audio-video summary 214 includes background music. If so, the music filtering operation 818 can isolate the existing background music and generate an output representing filtered background music 820. One or more user preferences 822 can also be received by the background music generation operation 226 here, where the one or more user preferences 822 are associated with a user's preference(s) related to music or other audio enhancements. For instance, the user preference(s) 822 may indicate whether the user wants background music added or enhanced and, if so, one or more characteristics of the background music preferred by the user. Note that the user preference(s) 822 may or may not include or be a part of the user preference(s) 210 described above.

The outputs 812, the video captions 816, and the user preference(s) 822 are provided to a decision network 824, which generally operates to process this information and determine whether audio enhancements for the audio-video summary 214 should be generated. The decision network 824 may use any suitable logic to determine whether audio enhancements for the audio-video summary 214 should be generated. For example, the decision network 824 may determine whether background music of suitable quality is already included in the audio-video summary 214, and the decision network 824 may determine whether the one or more user preferences 822 indicate that audio enhancements should or should not occur. If audio enhancements for the audio-video summary 214 should not be generated, the decision network 824 can make a "no enhancements" determination 826, in which case no audio enhancements may need to be generated for the audio-video summary 214.

Otherwise, the outputs 812, the video captions 816, the user preference(s) 822, and optionally the filtered background music 820 (if present) are provided to a generative machine learning model 828. The generative machine learning model 828 generally operates to process this information and generate background music 830, which can be inserted into the audio-video summary 214 during generation of an enhanced audio-video summary 230. For example, if background music already exists in the audio-video summary 214, the generative machine learning model 828 can perform music-to-music enhancement based on the filtered background music 820 in order to produce improved or enhanced background music. The improved or enhanced background music may have any suitable improved characteristic(s) relative to the original filtered background music 820, such as a different volume, tempo, or start/stop points. If no background music already exists in the audio-video summary 214, the generative machine learning model 828 can perform text-to-music generation based on the video captions 816 in order to produce new background music. The generative machine learning model 828 can use any suitable machine learning-based technique to generate background music or other audio enhancements for an audio-video summary 214. For instance, the generative machine learning model 828 can be trained using audio-video programs or summaries having known background music soundtracks, and the generative machine learning model 828 can be trained to generate similar background music soundtracks based on the features of a current audio-video summary 214.

Although FIG. 8 illustrates one example of a background music generation operation 226 in the architecture 200 of FIG. 2, various changes may be made to FIG. 8. For example, various components or functions in FIG. 8 may be combined, further subdivided, replicated, or rearranged according to particular needs. Also, one or more additional components or functions may be included if needed or desired. Further, while described as generating background music, the generation operation 226 may be used to generate any other enhanced audio content of audio-video summaries. In addition, while often described as processing features of audio-video summaries 214, the features may also or alternatively represent features of audio-video programs 202 (since the audio-video summaries 214 can be generated using the audio-video programs 202).

Figure 9:
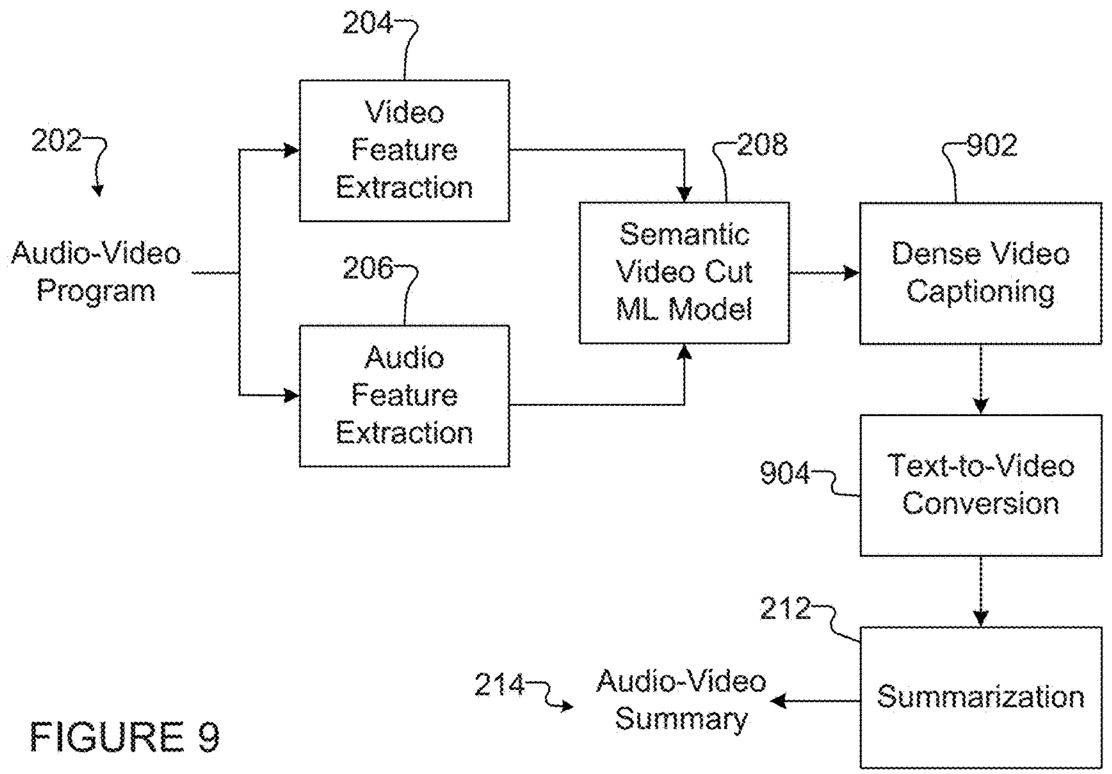
FIGS. 9 and 10 illustrate additional operations that may be performed in the architecture of FIG. 2 in accordance with this disclosure.
Figure 10:
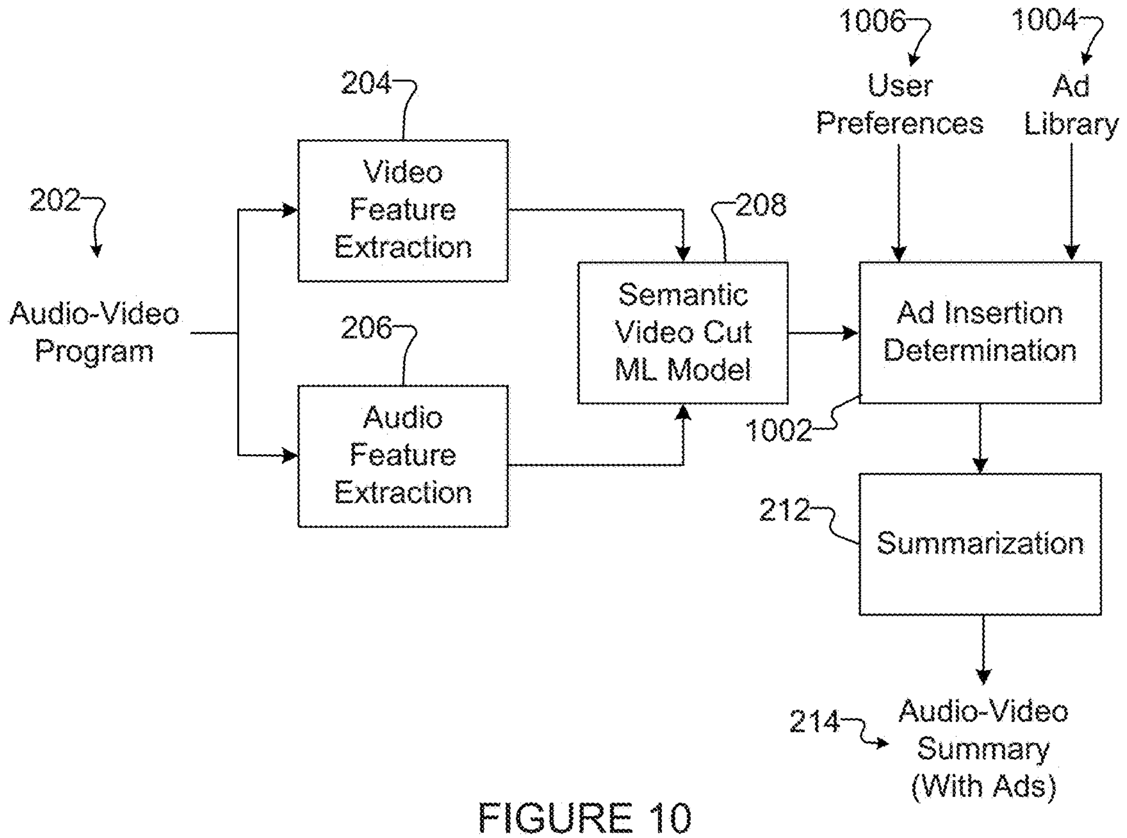

FIGS. 9 and 10 illustrate additional operations that may be performed in the architecture 200 of FIG. 2 in accordance with this disclosure. As shown in FIG. 9, the architecture 200 may be modified so that the scenes and semantic labels generated by the semantic video cut machine learning model 208 are provided to a dense video captioning operation 902. The dense video captioning operation 902 (like the video captioning operation 814) generally operates to process information in order to generate video captions, which can represent text-based descriptions or other descriptions describing the actions or other events occurring within the audio-video program 202. However, the dense video captioning operation 902 may be configured to provide greater details associated with the audio-video program 202 in the descriptions contained in the video captions compared to the video captioning operation 814.

The video captions generated by the dense video captioning operation 902 are provided to a text-to-video conversion operation 904, which represents a generative machine learning model that is trained to generate artificial video content and artificial audio content based on the video captions. For example, the text-to-video conversion operation 904 can use the video captions to create machine-generated video content having the same general actions or other events as the associated audio-video program 202. The text-to-video conversion operation 904 can also or alternatively use the video captions to create machine-generated audio content having the same speech or other sounds as the associated audio-video program 202. Effectively, the text-to-video conversion operation 904 converts original video and/or audio content into machine-generated video and/or audio content, where the machine-generated content is used by the summarization operation 212 to produce the audio-video summary 214.

This approach allows dense video captioning to follow the semantic video cut machine learning model 208 in order to transfer each identified scene into one or more video captions, and this approach allows the text-to-video conversion operation 904 to convert the scenes' video captions into machine-generated content while keeping the same semantic concepts. This may be necessary or desirable in various circumstances. For example, there may be times when an audio-video program 202 includes one or more trademarks, songs, or other content that should be omitted from the associated audio-video summary 214, and this approach can help to ensure that this content is not included in the audio-video summary 214 being generated.

As shown in FIG. 10, the architecture 200 may be modified in order to support ad insertion into the audio-video summaries 214 or the enhanced audio-video summaries 230 being generated. In this example, the semantic video cut machine learning model 208 can be extended to support ad placement identification. For example, the cut position regression operation 320 of the semantic video cut machine learning model 208 can be designed or trained to identify locations in audio-video programs 202 where ads might be placed without jeopardizing user watching experiences. As a particular example, the cut position regression operation 320 can be designed or trained to identify certain locations in audio-video programs 202, such as one or more locations near the start of an audio-video program 202 in between scenes, near the middle of the audio-video program 202 in between scenes, and near the end of the audio-video program 202 in between scenes. Also, the semantic prediction operation 322 of the semantic video cut machine learning model 208 can be designed or trained to predict semantic labels for the scenes, which can be used to determine whether the same semantic label is used before and after each possible location for an ad. This may allow, for instance, a determination of whether an ad location occurs in between two different genres or other types of sequences in an audio-video program 202. This may allow at least one ad to be inserted at a clear break of an audio-video program 202, rather than being inserted in the middle of a dramatic or other related sequence of events (where a user may be disturbed if there is an interruption in the associated audio-video summary 214).

An ad insertion operation 1002 can use the information from the semantic video cut machine learning model 208 in order to select which ads (if any) can be used to create an audio-video summary 214. For example, the ad insertion operation 1002 may have access to an ad library 1004, which can store a number of ads related to various topics that might possibly be inserted into the audio-video summary 214. The ad insertion operation 1002 may also receive one or more user preferences 1006, which can identify user interests or other user preferences that may be used to identify ads of interest to a user. Note that the user preference(s) 1006 may or may not include or be a part of the user preference(s) 210, 822 described above. The ad insertion operation 1002 can identify which ads in the ad library 1004 might be of interest to a particular user based on that user's user preference(s) 1006, and the ad insertion operation 1002 can select one or more ads from the ad library 1004 for inclusion in the audio-video summary 214. The ad insertion operation 1002 can also identify when the one or more ads are inserted into the audio-video summary 214. For instance, the ad insertion operation 1002 may identify ad locations that are approximately ten to twelve minutes apart in the audio-video summary 214 (although other intervals may be used). The resulting audio-video summary 214 generated by the summarization operation 212 may therefore include the subset of scenes from the audio-video program 202 and one or more ads at the identified location(s).

Although FIGS. 9 and 10 illustrate examples of additional operations that may be performed in the architecture 200 of FIG. 2, various changes may be made to FIGS. 9 and 10. For example, any suitable combination of operations described above may be used in the architecture 200, even if that particular combination is not explicitly illustrated. As a particular example, the ability to insert ads into an audio-video summary (as is done in FIG. 10) may be used in conjunction with machine generation of video content and/or audio content for an audio-video summary (as is done in FIG. 9). Also, while the enhancement pipeline is not shown in FIGS. 9 and 10, the additional operations shown in FIGS. 9 and 10 may be used in embodiments where the audio-video summary 214 is subsequently enhanced as described with respect to FIG. 2.

Figure 11:
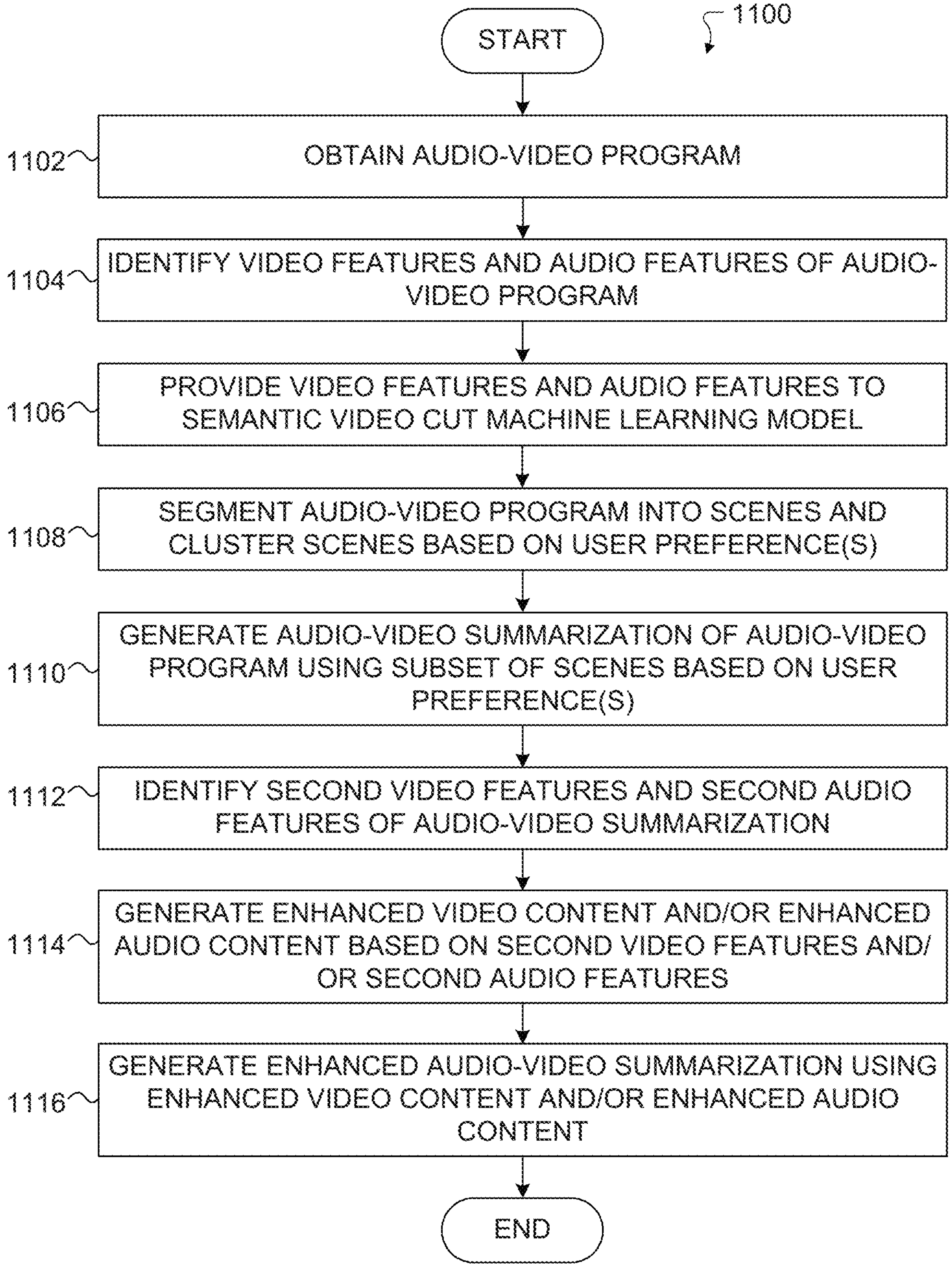
FIG. 11 illustrates an example method for machine learning-based personalized audio-video program summarization and enhancement in accordance with this disclosure.

FIG. 11 illustrates an example method 1100 for machine learning-based personalized audio-video program summarization and enhancement in accordance with this disclosure. For ease of explanation, the method 1100 shown in FIG. 11 is described as being performed by the electronic device 101 in the network configuration 100 of FIG. 1, where the electronic device 101 may implement or support the architecture 200 shown in FIG. 2. However, the method 1100 shown in FIG. 11 could be used with any other suitable device(s) (such as the server 106) and in any other suitable system(s), and the method 1100 shown in FIG. 11 could be used with any suitable architecture.

As shown in FIG. 11, an audio-video program is obtained at step 1102. This may include, for example, the processor 120 of the electronic device 101 obtaining an audio-video program 202 from any suitable source. Video features and audio features of the audio-video program are identified at step 1104. This may include, for example, the processor 120 of the electronic device 101 performing the video feature extraction operation 204 to identify video features 302 of the audio-video program 202 and performing the audio feature extraction operation 206 to identify audio features 304 of the audio-video program 202.

The video features and the audio features are provided to a semantic video cut machine learning model at step 1106, and the audio-video program is segmented into scenes and the scenes are clustered based on one or more user preferences using the semantic video cut machine learning model at step 1108. This may include, for example, the processor 120 of the electronic device 101 processing the video features 302 and the audio features 304 using the semantic video cut machine learning model 208 as shown in FIG. 3. The semantic video cut machine learning model 208 is trained to identify the different scenes of the audio-video program 202 and to cluster the identified scenes using semantic labels.

An audio-video summarization of the audio-video program is generated using a subset of the scenes based on the one or more user preferences at step 1110. This may include, for example, the processor 120 of the electronic device 101 performing the summarization operation 212 to concatenate or otherwise combine a subset of scenes of the audio-video program 202, where those scenes satisfy the one or more user preferences 210, in order to generate an audio-video summary 214. This may include the processor 120 of the electronic device 101 optionally performing the dense video captioning operation 902 and the text-to-video conversion operation 904 in order to generate artificial video content and artificial audio content based on the subset of scenes. This may also or alternatively include the processor 120 of the electronic device 101 optionally performing the ad insertion operation 1002 in order to insert one or more ads into the audio-video summary 214. At this point, the method 1100 may end if no enhancement of the audio-video summary 214 is needed or desired, and the audio-video summary 214 may be used in any suitable manner. For instance, the audio-video summary 214 may be presented in a guide or otherwise made available in a graphical display or other interface for selection or viewing by a user.

Video features and audio features of the audio-video summarization are identified at step 1112. This may include, for example, the processor 120 of the electronic device 101 performing the video feature extraction operation 216 to identify video features 502, 802 of the audio-video summary 214 and performing the audio feature extraction operation 218 to identify audio features 802 of the audio-video summary 214. Enhanced video content and/or enhanced audio content is generated based on the second video features and/or the second audio features at step 1114. This may include, for example, the processor 120 of the electronic device 101 performing the immersive experience video enhancement operation 220 in order to generate enhanced video content 508 and/or performing the background music generation operation 226 in order to generate background music 830. In some cases, the immersive experience video enhancement operation 220 may be used to generate video content having a slow motion video effect and/or video content having a 360° video effect. The enhanced video content may be generated using the frame interpolation machine learning model 506, which can be trained to generate one or more video effects based on (i) one or more frames of the audio-video program 202 or the audio-video summary 214 and/or (ii) motion and optical flow estimation associated with the audio-video program 202 or the audio-video summary 214. Also, in some cases, the background music generation operation 226 may be used to enhance existing background music in the audio-video program 202 and/or to produce new machine-generated background music.

An enhanced audio-video summarization is generated at step 1116. This may include, for example, the processor 120 of the electronic device 101 performing the enhancement operation 228 to generate an enhanced audio-video summary 230 using the enhanced video content and/or the enhanced audio content. As a particular example, the enhancement operation 228 may combine the enhanced video content and/or the enhanced audio content with unenhanced portions of the audio-video summary 214 in order to generate the enhanced audio-video summary 230. At this point, the enhanced audio-video summary 230 may be used in any suitable manner. For instance, the enhanced audio-video summary 230 may be presented in a guide or otherwise made available in a graphical display or other interface for selection or viewing by a user.

Although FIG. 11 illustrates one example of a method 1100 for machine learning-based personalized audio-video program summarization and enhancement, various changes may be made to FIG. 11. For example, while shown as a series of steps, various steps in FIG. 11 may overlap, occur in parallel, occur in a different order, or occur any number of times (including zero times). Also, the audio-video summary 214 or the enhanced audio-video summary 30 may be used in any suitable manner and is not limited to the specific use cases provided above.

It should be noted that the functions shown in or described with respect to FIGS. 2 through 11 can be implemented in an electronic device 101, server 106, or other device(s) in any suitable manner. For example, in some embodiments, at least some of the functions shown in or described with respect to FIGS. 2 through 11 can be implemented or supported using one or more software applications or other software instructions that are executed by the processor 120 of the electronic device 101, server 106, or other device(s). In other embodiments, at least some of the functions shown in or described with respect to FIGS. 2 through 11 can be implemented or supported using dedicated hardware components. In general, the functions shown in or described with respect to FIGS. 2 through 11 can be performed using any suitable hardware or any suitable combination of hardware and software/firmware instructions. Also, the functions shown in or described with respect to FIGS. 2 through 11 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

identifying video features and audio features of an audio-video program;

processing the video features and the audio features using a semantic video cut machine learning model that is trained to (i) segment the audio-video program into multiple scenes and (ii) cluster the scenes based on one or more user preferences; and generating an audio-video summarization of the audio-video program using a subset of the scenes based on the one or more user preferences;

wherein the semantic video cut machine learning model comprises:

transformer encoder layers configured to encode the video features and the audio features and generate encoded video features and encoded audio features;

a concatenation layer configured to combine the encoded video features and the encoded audio features and generate combined encoded features;

a transformer decoder layer configured to decode the combined encoded features and generate an initial cut position proposal; and at least one of:

a region of interest pooling layer configured to use the initial cut position proposal, the video features, and the audio features and generate a processed cut position proposal;

one or more convolutional layers configured to convolve the processed cut position proposal and generate a convolved cut position proposal;

a cut position regressor configured to generate a fine-tuned cut position proposal based on the convolved cut position proposal, the fine-tuned cut position proposal identifying a segmentation of the audio-video program into the multiple scenes; or a semantic predictor configured to cluster the scenes based on the convolved cut position proposal and the one or more user preferences.

2. The method of claim 1, wherein generating the audio-video summarization comprises:

providing the subset of the scenes to a generative machine learning model; and generating artificial video and audio content based on the subset of the scenes using the generative machine learning model, the audio-video summarization comprising the artificial video and audio content.

3. The method of claim 1, further comprising:

identifying second video features and second audio features of the audio-video summarization;

generating at least one of enhanced video content and enhanced audio content based on the second video features and the second audio features; and generating an enhanced audio-video summarization comprising at least one of the enhanced video content and the enhanced audio content.

4. The method of claim 3, wherein:

the enhanced video content comprises at least one of: video content having a slow motion video effect or video content having a 360° video effect; and the enhanced audio content comprises at least one of: enhanced background music from the audio-video program or machine-generated background music.

5. The method of claim 3, wherein the enhanced video content is generated using a frame interpolation machine learning model that is trained to generate one or more video effects based on at least one of: (i) one or more frames of the audio-video program or the audio-video summarization and (ii) motion and optical flow estimation associated with the audio-video program or the audio-video summarization.

6. The method of claim 5, wherein the frame interpolation machine learning model comprises:

an encoder comprising multiple convolution layers and configured to encode the one or more frames of the audio-video program or the audio-video summarization and generate embeddings;

a flow estimator configured to process the embeddings and generate optical flow estimations;

a transformer layer configured to process at least some of the embeddings and generate transformed embeddings; and a decoder comprising multiple deconvolution layers and configured to decode the transformed embeddings and generate an interpolated frame using the optical flow estimations.

7. The method of claim 1, wherein the transformer encoder layers comprise:

first transformer encoder layers configured to encode the video features and generate the encoded video features; and second transformer encoder layers configured to encode the audio features and generate the encoded audio features; and wherein the semantic video cut machine learning model comprises all of the region of interest pooling layer, the one or more convolutional layers, the cut position regressor, and the semantic predictor.

8. The method of claim 1, wherein:

the semantic video cut machine learning model is configured to identify locations in the audio-video program for ads; and generating the audio-video summarization comprises generating the audio-video summarization with one or more ads at one or more of the identified locations, the one or more ads based on one or more additional user preferences.

9. An electronic device comprising:

at least one processing device configured to:

identify video features and audio features of an audio-video program;

process the video features and the audio features using a semantic video cut machine learning model that is trained to (i) segment the audio-video program into multiple scenes and (ii) cluster the scenes based on one or more user preferences;

generate an audio-video summarization of the audio-video program using a subset of the scenes based on the one or more user preferences;

identify second video features of the audio-video summarization;

generate enhanced video content based on the second video features using a frame interpolation machine learning model; and generate an enhanced audio-video summarization comprising the enhanced video content;

wherein the frame interpolation machine learning model comprises:

an encoder comprising multiple convolution layers and configured to encode one or more frames of the audio-video program or the audio-video summarization and generate embeddings;

a flow estimator configured to process the embeddings and generate optical flow estimations;

a transformer layer configured to process at least some of the embeddings and generate transformed embeddings; and a decoder comprising multiple deconvolution layers and configured to decode the transformed embeddings and generate an interpolated frame using the optical flow estimations.

10. The electronic device of claim 9, wherein, to generate the audio-video summarization, the at least one processing device is configured to:

provide the subset of the scenes to a generative machine learning model; and generate artificial video and audio content based on the subset of the scenes using the generative machine learning model, the audio-video summarization comprising the artificial video and audio content.

11. The electronic device of claim 9, wherein;

the at least one processing device is further configured to identify second audio features of the audio-video summarization and generate enhanced audio content based on the second audio features; and the enhanced audio-video summarization further comprises the enhanced audio content.

12. The electronic device of claim 11, wherein the enhanced audio content comprises at least one of: enhanced background music from the audio-video program or machine-generated background music.

13. The electronic device of claim 2, wherein the frame interpolation machine learning model is trained to generate one or more video effects based on at least one of: (i) the one or more frames of the audio-video program or the audio-video summarization and (ii) motion and optical flow estimation associated with the audio-video program or the audio-video summarization.

14. The electronic device of claim 9, wherein the enhanced video content comprises at least one of: video content having a slow motion video effect or video content having a 360° video effect.

15. The electronic device of claim 9, wherein the semantic video cut machine learning model comprises:

first transformer encoder layers configured to encode the video features and generate encoded video features;

second transformer encoder layers configured to encode the audio features and generate encoded audio features;

a concatenation layer configured to combine the encoded video features and the encoded audio features and generate combined encoded features;

a transformer decoder layer configured to decode the combined encoded features and generate an initial cut position proposal;

a region of interest pooling layer configured to use the initial cut position proposal, the video features, and the audio features to generate a processed cut position proposal;

one or more convolutional layers configured to convolve the processed cut position proposal and generate a convolved cut position proposal;

a cut position regressor configured to generate a fine-tuned cut position proposal based on the convolved cut position proposal, the fine-tuned cut position proposal identifying a segmentation of the audio-video program into the multiple scenes; and a semantic predictor configured to cluster the scenes based on the convolved cut position proposal and the one or more user preferences.

16. The electronic device of claim 9, wherein:

the semantic video cut machine learning model is configured to identify locations in the audio-video program for ads; and the at least one processing device is configured to generate the audio-video summarization with one or more ads at one or more of the identified locations, the one or more ads based on one or more additional user preferences.

17. A non-transitory machine readable medium containing instructions that when executed cause at least one processor of an electronic device to:

identify video features and audio features of an audio-video program;

process the video features and the audio features using a semantic video cut machine learning model that is trained to (i) segment the audio-video program into multiple scenes and (ii) cluster the scenes based on one or more user preferences; and generate an audio-video summarization of the audio-video program using a subset of the scenes based on the one or more user preferences;

wherein the semantic video cut machine learning model comprises:

transformer encoder layers configured to encode the video features and the audio features in order to generate encoded video features and generate encoded audio features;

a concatenation layer configured to combine the encoded video features and the encoded audio features in order to generate combined encoded features;

a transformer decoder layer configured to decode the combined encoded features in order to generate an initial cut position proposal; and at least one of:

a region of interest pooling layer configured to use the initial cut position proposal, the video features, and the audio features in order to generate a processed cut position proposal;

one or more convolutional layers configured to convolve the processed cut position proposal in order to generate a convolved cut position proposal;

a cut position regressor configured to generate a fine-tuned cut position proposal based on the convolved cut position proposal, the fine-tuned cut position proposal identifying a segmentation of the audio-video program into the multiple scenes; or a semantic predictor configured to cluster the scenes based on the convolved cut position proposal and the one or more user preferences.

18. The non-transitory machine readable medium of claim 17, wherein the instructions that when executed cause the at least one processor to generate the audio-video summarization comprise:

instructions that when executed cause the at least one processor to:

provide the subset of the scenes to a generative machine learning model; and generate artificial video and audio content based on the subset of the scenes using the generative machine learning model, the audio-video summarization comprising the artificial video and audio content.

19. The non-transitory machine readable medium of claim 17, further containing instructions that when executed cause the at least one processor to:

identify second video features and second audio features of the audio-video summarization;

generate at least one of enhanced video content and enhanced audio content based on the second video features and the second audio features; and generate an enhanced audio-video summarization comprising at least one of the enhanced video content and the enhanced audio content.

20. The non-transitory machine readable medium of claim 17, wherein the transformer encoder layers comprise:

first transformer encoder layers configured to encode the video features and generate the encoded video features; and second transformer encoder layers configured to encode the audio features and generate the encoded audio features; and wherein the semantic video cut machine learning model comprises all of the region of interest pooling layer, the one or more convolutional layers, the cut position regressor, and the semantic predictor.

* * * * *